F. W. MASEK.
APPARATUS FOR MOISTENING AIR.
APPLICATION FILED APR. 26, 1915.
1,228,801.
Patented June 5, 1917.
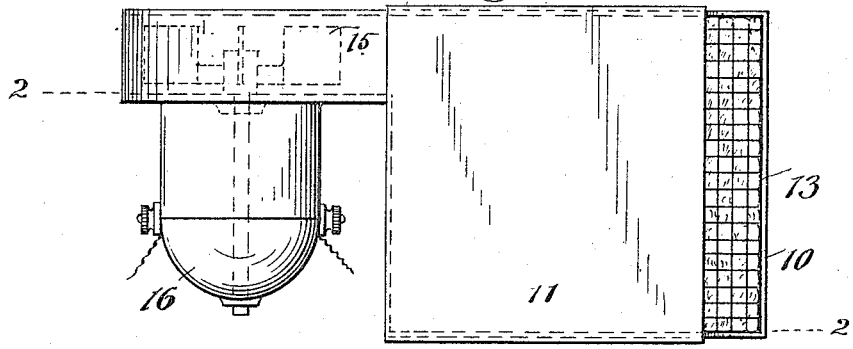
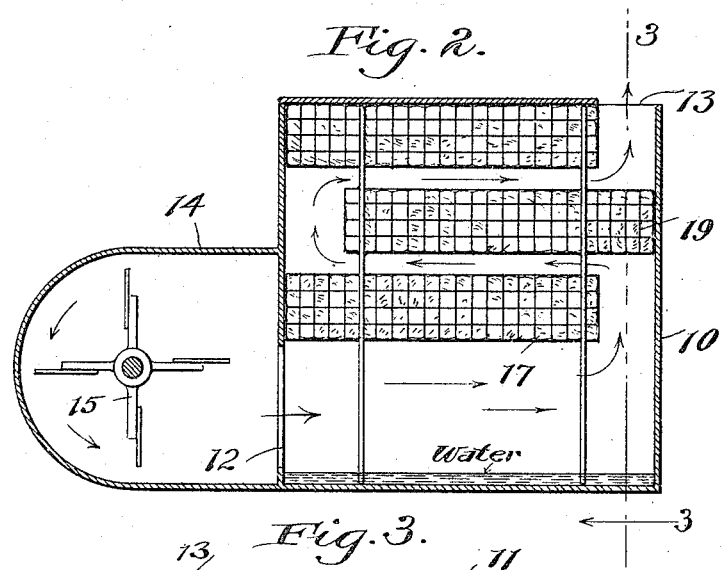
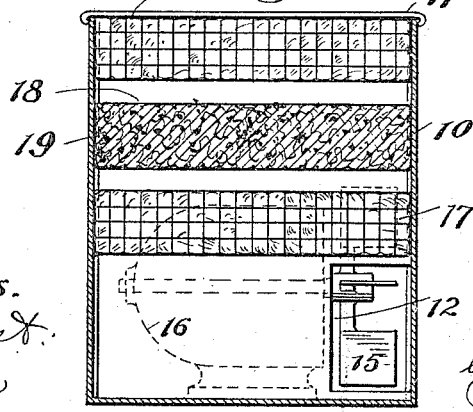
Witnesses.
E. B. Gilchrist.
H. M. Wise.
Inventor
Frank W. Masek
by Thurston & Kwis
Attys.

UNITED STATES PATENT OFFICE.

FRANK W. MASEK, OF CLEVELAND, OHIO.

APPARATUS FOR MOISTENING AIR.

1,228,801.  Specification of Letters Patent.  Patented June 5, 1917.

Application filed April 26, 1915. Serial No. 23,820.

*To all whom it may concern:*

Be it known that I, FRANK W. MASEK, a citizen of the United States, residing at Cleveland, in the county of Cuyahoga and State of Ohio, have invented a certain new and useful Improvement in Apparatus for Moistening Air, of which the following is a full, clear, and exact description.

This invention relates to a humidifier or to an apparatus for moistening air.

The main object of the invention is to provide an apparatus of this character which is small and compact, but which will nevertheless humidify or dampen a large volume of air passing at a rapid rate through the apparatus. Still further, the invention aims to provide a humidifier which can be conveniently employed in connection with or as an attachment to cigar or tobacco cases, or similar devices containing materials which are to be maintained in a more or less moistened condition.

In carrying out my invention, I employ a chamber or casing having an inlet opening in which normally dry air may be blown by a fan and containing one or more and preferably a plurality of shelves or trays so arranged that the air is caused to pass back and forth in contact with the surfaces thereof, these shelves or trays being preferably composed of containers or receptacles formed from wire mesh or netting and filled with mineral wool or other absorbent material which may be saturated with water.

The invention may be further briefly summarized as consisting in certain novel details of construction and combinations and arrangements of parts which will be described in the specification and set forth in the accompanying claims.

In the accompanying sheet of drawings wherein I have shown the preferred embodiment of my invention, Figure 1 is a plan view of the apparatus; Fig. 2 is a vertical section substantially along the line 2—2 of Fig. 1; and Fig. 3 is a vertical section substantially along the line 3—3 of Fig. 2.

Referring now to the drawings, 10 represents rectangular shaped casing or chamber having a removable cover 11 which will be removed when it is desired to add water to the absorbent material contained in the shelves or trays. This chamber is provided on one side and near the lower corner thereof with an air inlet opening 12, and is provided at the top with an air outlet opening 13, this outlet opening preferably extending entirely across the top of the chamber. Adjacent the inlet opening 12 there is provided a fan casing 14 having a fan 15 which is adapted to discharge air into the chamber 10, or to cause the air to flow from the inlet opening 12 through the apparatus and out through the outlet opening. This fan is driven by an electric motor indicated conventionally at 16.

The chamber is provided on the interior with a plurality of shelves or trays 17 which extend horizontally or transversely of the chamber and project alternately from opposite sides or ends of the same. There may be any number of these trays, three being shown in the drawing. Each of these trays is of rectangular shape and is in the form of a receptacle formed from wire mesh or netting 18, and each of these tray receptacles is filled or packed with mineral wool 19 or other suitable more or less loose material which will absorb and hold a quantity of water.

In the use of this apparatus the water will be supplied to the trays until the absorbent material is practically saturated. Any excess water dropping from the lowermost tray will fall to the bottom of the casing which is in the form of a tray and will hold the excess quantity of water. The water in each tray will naturally gravitate to the lower portion thereof. When the fan is in operation, the air will sweep along the bottom of the lowermost tray, and thence pass upwardly to the space between the lowermost and middle tray, and will then sweep along the lower side of the middle tray or along the upper and lower sides of the two trays; then it will pass upwardly to the space between the two uppermost trays and after passing or sweeping along the sides of the two uppermost trays will pass upwardly to the outlet opening through which the now dampened air will pass to the casing or receptacle into which the dampened air is to be blown.

The construction of the tray including the contents thereof and the arrangement of the same constitute an important part of the present invention, for it is due largely to these features that my invention possesses its high efficiency. The material in the lower portions of trays is maintained in a more or less saturated condition by reason of the fact that the water gravitates naturally toward the bottom of the tray, and as the water is taken up the air passing along the bottom of the tray is constantly replaced by that passing downward from above. In consequence, the water is picked up principally from the lower sides of the tray, and hence it is important that these trays be of a construction such that the air passing along the bottom thereof may come in contact with the material containing or holding the water.

Having thus described my invention, what I claim is:—

1. In an apparatus for moistening air, a casing provided with inlet and outlet openings, means for forcing air therethrough, a plurality of reticulated supports extending substantially horizontally and alternately from opposite sides of the casing at different elevations and spaced apart to form a zig-zag passageway for air between the inlet and outlet openings, and absorbent media adapted to hold water resting upon said supports.

2. In an apparatus for moistening air, a casing provided with inlet and outlet openings, means for forcing air therethrough, a receptacle supported substantially horizontally within said casing intermediate the inlet and outlet openings in a manner to require the air to pass along the lower side and then over the upper side thereof, said receptacle having an open top and a reticulated bottom, and absorbent material adapted to retain water within the receptacle.

3. In an apparatus for moistening air, a casing provided with inlet and outlet openings, means for forcing air therethrough, a receptacle supported substantially horizontally within said casing intermediate the inlet and outlet openings in a manner to require the air to pass along the lower side and then over a side wall and across the top in succession, said receptacle having an open top and reticulated side and bottom walls, and absorbent material within the receptacle.

4. An apparatus for moistening air, a chamber having inlet and outlet openings, means for causing air to pass through the chamber, said chamber having a plurality of receptacles extending horizontally alternately from opposite sides and spaced apart so as to form a zig-zag path for the air passing through the casing, said receptacles being formed of wire mesh or netting and containing water absorbing material.

In testimony whereof, I hereunto affix my signature in the presence of two witnesses.

FRANK W. MASEK.

Witnesses:
 A. F. KWIS,
 L. I. PORTER.

Copies of this patent may be obtained for five cents each, by addressing the "Commissioner of Patents, Washington, D. C."